(12) United States Patent
Lemmens et al.

(10) Patent No.: US 7,562,750 B2
(45) Date of Patent: Jul. 21, 2009

(54) AIR PRESSURE PROPORTIONAL DAMPER FOR SHOCK ABSORBER

(75) Inventors: Luc Lemmens, Genk (BE); Sjaak Schel, Maastricht (NL); Koen Vermolen, Boechout (BE); Simon A de Molina, Marche-les-Dames (BE); Walter Spiritus, St. Truiden (BE); Bart Vandewal, Alken (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 739 days.

(21) Appl. No.: 10/775,881

(22) Filed: Feb. 10, 2004

(65) Prior Publication Data

US 2005/0173214 A1     Aug. 11, 2005

(51) Int. Cl.
*B60G 17/08*     (2006.01)
(52) U.S. Cl. .................. 188/266.1; 188/266.6
(58) Field of Classification Search .... 188/313–322.22, 188/266.1, 266.6; 280/5.505
See application file for complete search history.

(56) References Cited

U.S. PATENT DOCUMENTS

| | | | |
|---|---|---|---|
| 4,113,072 A * | 9/1978 | Palmer | 188/282.6 |
| 4,614,255 A | 9/1986 | Morita et al. | |
| 4,683,992 A | 8/1987 | Watanabe | |
| 4,802,561 A | 2/1989 | Knecht et al. | |
| 4,887,515 A | 12/1989 | Tabata | |
| 4,964,492 A | 10/1990 | Joseph | |
| 4,972,928 A | 11/1990 | Sirven | |
| 5,113,980 A | 5/1992 | Furrer et al. | |
| 5,143,185 A | 9/1992 | Klein et al. | |
| 5,146,948 A | 9/1992 | Runkel | |
| 5,163,538 A | 11/1992 | Derr et al. | |
| 5,180,039 A | 1/1993 | Axthammer et al. | |
| 5,220,983 A | 6/1993 | Furrer et al. | |
| 5,282,645 A | 2/1994 | Spakowski et al. | |
| 5,301,412 A | 4/1994 | Hahn et al. | |
| 5,328,004 A | 7/1994 | Fannin et al. | |
| 5,335,757 A | 8/1994 | Knecht et al. | |
| 5,372,223 A | 12/1994 | De Kock | |
| 5,386,893 A | 2/1995 | Feigel | |
| 5,398,787 A | 3/1995 | Woessner et al. | |
| 5,423,402 A | 6/1995 | De Kock | |
| 5,431,259 A | 7/1995 | Mizutani et al. | |
| 5,439,085 A | 8/1995 | Woessner | |
| 5,462,142 A | 10/1995 | Handke et al. | |
| 5,464,079 A | 11/1995 | Lohberg et al. | |
| 5,467,852 A | 11/1995 | De Kock | |
| 5,472,070 A | 12/1995 | Feigel | |
| 5,533,596 A * | 7/1996 | Patzenhauer et al. | 188/266.6 |
| 5,556,082 A | 9/1996 | Takasaki | |
| 5,558,189 A | 9/1996 | Beck | |
| 5,586,627 A | 12/1996 | Nezu et al. | |
| 5,597,054 A | 1/1997 | Nagai et al. | |
| 5,725,239 A * | 3/1998 | de Molina | 280/5.503 |
| 5,924,528 A * | 7/1999 | Vermolen et al. | 188/266.1 |
| 5,934,422 A | 8/1999 | Steed | |
| 6,527,093 B2 * | 3/2003 | Oliver et al. | 188/322.2 |

* cited by examiner

*Primary Examiner*—Christopher P Schwartz
(74) *Attorney, Agent, or Firm*—Harness, Dickey & Pierce, PLC (57) ABSTRACT

An air pressure proportional damper includes a first chamber and a second chamber. The first chamber is fluidly attached to the second chamber through an air adjustment valve. The air adjustment valve regulates flow from the first chamber to the second chamber in proportion to air pressure received from an accompanying air spring.

17 Claims, 5 Drawing Sheets

AIR PRESSURE PROPORTIONAL DAMPER FOR SHOCK ABSORBER

FIELD OF THE INVENTION

The present invention generally relates to a shock absorber, and more particularly, the present invention relates to a shock absorber having damping characteristics proportional to the air pressure in accompanying air springs.

BACKGROUND OF THE INVENTION

In many conventional vehicles, air springs replace a vehicle's leaf or coil springs and they accompany the existing shock absorbers on a motor vehicle. The purpose of the air springs is to support the vehicle body on the vehicle suspension and the purpose of the shock absorbers is to dampen the relative movement between the vehicle body and the vehicle suspension. As such, air springs typically utilize the elasticity of air under compression to support the vehicle load instead of the elasticity of metal under elastic deformation as is the case in coil or leaf springs. Typically, air is contained in a chamber and the air is compressed by the vehicle load. The air's compression is what provides the additional spring action and support for the vehicle. Accordingly, when a heavy load on the vehicle is present, the air pressure in the chamber of the air spring is greater than when a smaller load is applied thereto.

When a heavy load is applied, it is desirable for the vehicle's shock absorbers to have more firm damping characteristics than when a light load is applied. However, as the damping characteristics of the conventional shock absorber are based primarily on internal characteristics of the shock absorber itself, it does not have the ability to adjust for this load variation. The present invention was developed in light of these and other drawbacks.

SUMMARY OF THE INVENTION

To address these and other drawbacks, the present invention provides an air pressure proportional damper for absorbing vibration transferred from an unsprung mass to a sprung mass on a vehicle that includes a container having a first chamber and a second chamber with a rod slidingly disposed in the first chamber of the container. A sliding member is attached to the rod which is in sliding engagement with the walls of the first chamber. A valve is disposed between the first and the second chamber that regulates fluid flow between the first chamber and the second chamber. A pressure signal is supplied from an air spring to the valve. The valve regulates the flow from the first chamber to the second chamber proportional to the pressure signal.

In another aspect of the present invention, the air adjustment valve includes a nipple support supporting a nipple that has an aperture there through. A bottom portion of the nipple communicates with the first chamber. The air adjustment valve has a lower membrane with a first side contacting an upper side of the nipple and aperture, a plunger is supported by a plunger support having a first end contacting the second side of the membrane, an upper membrane having a first side contacting a second end of the plunger and a hose attachment housing that is slidingly supported by a guiding ring. A space is defined by an area between the hose attachment housing, guiding ring and second surface of the upper membrane. A spring is disposed in the guiding ring that biases the hose attachment housing toward the second side of the membrane. A second space is defined between the nipple support and the first side of the membrane that communicates with the second chamber.

In another aspect of the present invention, a down tube fluidly connects the first chamber to the air adjustment valve. The air adjustment valve comprises an air adjustment valve main body, an air adjustment valve lower main body attached to the air adjustment valve main body, a membrane held in position between the air adjustment valve lower main body and the air adjustment valve main body, a passage formed in the air adjustment valve main body that communicates air pressure to a top side of the membrane, a sliding valve slidingly supported by the air adjustment valve lower main body. One end of the sliding valve is positioned against a lower side of the membrane and an opposite side of the sliding valve has a valve seat that closes the down tube from passing fluid from the down tube to the second chamber. A spring is positioned between the valve seat and the sliding valve that biases the sliding valve against the membrane and biases the valve seat toward a closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
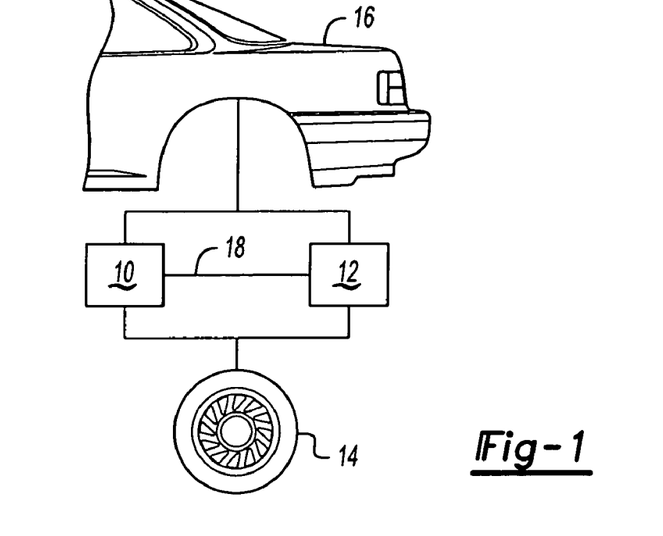
FIG. 1 is a schematic view of an air pressure proportional damper according to the present invention.

Referring now to FIG. 1, an air pressure proportional damper 10 is shown in parallel with an air spring 12 to dampen road vibrations traveling from a vehicle wheel 14 to a vehicle body 16. Air spring 12 operates similar to a conventional air spring as is known in the art by having an internal pressure that increases according to the load that vehicle body 16 applies to vehicle wheel 14. However, air spring 12 outputs a pressure signal 18, an air pressure signal in the present invention, which air pressure proportional damper 10 responds to by adjusting its damping force proportional to pressure signal 18. As such, air pressure proportional damper 10 increases in damping force as the pressure of air spring 12 increases. This ensures the most desirable stiff ride or firm damping of vehicle 16 during heavy loads. Contrarily, air pressure proportional damper 10 reduces its damping force as the pressure of air spring 12 decreases. Accordingly, the vehicle body 16 undergoes a soft ride or light damping during reduced loads.

Figure 2:
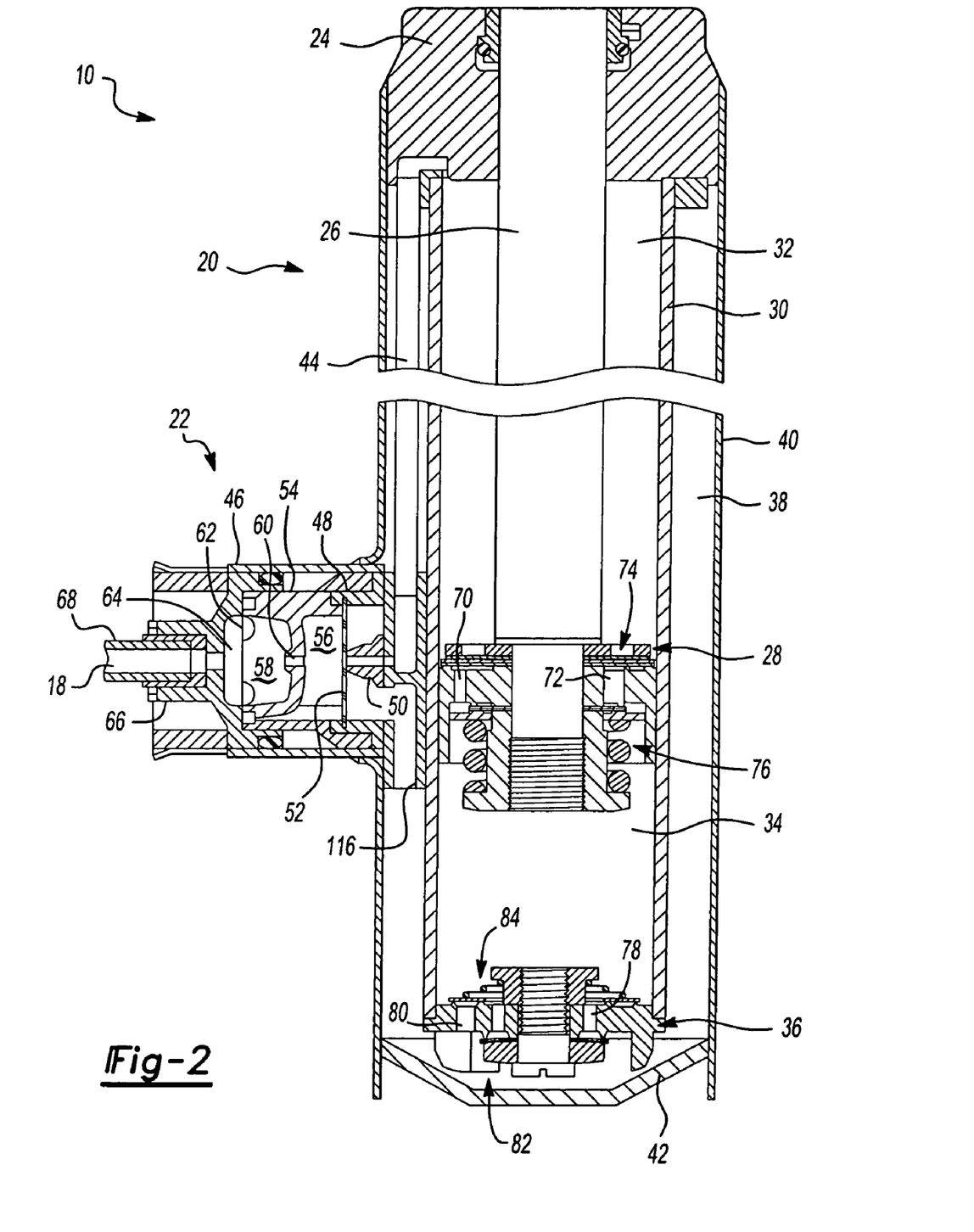
FIG. 2 is a cross sectional view of an air pressure proportional damper according to the present invention.

Referring now to FIG. 2, air pressure proportional damper 10 is shown having two main parts, a damper 20 and an air adjustment valve 22. Damper 20 includes an upper rod guide 24 that slidingly supports a piston rod 26. Piston rod 26 is cylindrical and extends from vehicle body 16 (not shown in FIG. 2), through upper rod guide 24, and downward to a piston 28. Damper 20 has a pressure tube 30 which serves to define an upper working chamber 32 and a lower working chamber 34. As such, pressure tube 30 and piston 28 serve to define the boundaries of upper working chamber 32. Likewise, lower working chamber 34 is generally defined by piston 28, a base valve assembly 36, and pressure tube 30.

External to pressure tube 30 is a reserve chamber 38. Reserve chamber 38 is defined by a reserve tube 40, pressure tube 30, upper rod guide 24 and an end cap 42. A down tube 44 extends from an upper rod guide passage to air adjustment valve 22. Down tube 44 is positioned inside reserve chamber 38. The upper rod guide passage is a small aperture formed within upper rod guide 24 to allow fluid to pass from upper working chamber 32 to down tube 44.

Air adjustment valve 22 includes a valve housing 46 that supports a plurality of the components of air adjustment valve 22. Reserve tube 40 engages valve housing 46 in a sealing manner to support and seal air adjustment valve 22. A nipple support 48 supports a nipple 50 and has an outer surface pressed into valve housing 46. A bottom portion of nipple 50 fluidly communicates with down tube 44 to allow fluid from down tube 44 to press against the inside of a lower membrane 52, also supported by nipple support 48. A fluid support 54 supports fluid contained in a chamber 56 and a chamber 58. Fluid in chamber 56 communicates with fluid in chamber 58 through an aperture 60 in fluid support 54. An upper membrane 62 separates an air chamber 64 from chamber 58. Air chamber 64 is defined by the inner walls of a hose attachment housing 66. Hose attachment housing 66 engages fluid support 54 to clamp upper membrane 62 in position. At an end of hose attachment housing 66 opposite to upper membrane 62, a hose 68 supplies air pressure from air spring 12 as the pressure signal 18.

Piston 28 defines a plurality of compression passages 70 and a plurality of rebound passages 72. A piston compression valve assembly 74 controls fluid flow through compression passages 70. A piston rebound valve assembly 76 controls fluid flow through rebound passages 72. Base valve assembly 36 defines a plurality of compression passages 78 and a plurality of rebound passages 80. A base compression valve assembly 82 controls the fluid flow through compression passages 78. A base rebound valve assembly 84 controls the fluid flow through rebound passages 80.

In operation, piston 28 slides back and forth within pressure tube 30 and piston 28 operates in conjunction with base valve assembly 36 and air adjustment valve 22 to move fluid between upper working chamber 32, lower working chamber 34 and reserve chamber 38 to absorb shock. Specifically, with upward movement of vehicle wheel 14, piston 28 and piston rod 26 move downward with respect to pressure tube 30 in what is called a compression stroke. This movement causes fluid in lower working chamber 34 to pass through compression passages 70 and past piston compression valve assembly 74 to pass to upper working chamber 32. Piston compression valve assembly 74 operates as a check valve and does not significantly contribute to creating the damping characteristics for shock absorber 10. Because piston rod 26 occupies space only in upper working chamber 32, an additional amount of fluid must be removed from lower working chamber 34. This additional fluid is forced through the upper rod guide passage and through down tube 44 to enter air adjustment valve 22. Fluid will also flow through compression passages 78 and base compression valve assembly 82 into reserve chamber 38. Base compression valve assembly 82 is designed to provide firm damping for damper 20 during a compression stroke. Air adjustment valve 22 allows fluid flow from upper working chamber 32 to reserve chamber 38 during a compression stroke to change the damping characteristics for shock absorber 10 from firm to soft.

The pressure signal 18 is determined by the air pressure in air spring 12. This air pressure from air spring 12 is transported by hose 68 to upper membrane 62. As such, upper membrane 62 presses oil in chamber 58 through aperture 60 and into chamber 56 to press lower membrane 52 against the surface of nipple 50, thereby controlling flow from down tube 44 to reserve chamber 38. When the air pressure is relatively low, (lightly loaded vehicle) the fluid flow through air adjustment valve 22 will increase providing a softer damping characteristic for shock absorber 10. When the air pressure is relatively high (heavily loaded vehicle) the fluid flow through air adjustment valve 22 will decrease providing a firmer damping characteristic for damper 20.

Thus, the damping characteristics for shock absorber 10 during a compression stroke are directly related to the air pressure within air spring 12.

With downward movement of vehicle wheel 14, piston 28 and piston rod 26 move upward with respect to pressure tube 30 in what is called a rebound stroke. This movement causes fluid in upper working chamber 32 to be pressurized and fluid flows through the upper rod guide passage and through down tube 44 to enter air adjustment valve 22. Fluid will also flow through rebound passages 72 and piston rebound valve assembly 76 into lower working chamber 34. Piston rebound valve assembly 76 is designed to provide firm damping for shock absorber 10 during a rebound stroke. Because piston rod 26 occupies space in only upper working chamber 32, an additional amount of fluid must be added to lower working chamber 34. This additional fluid flows from reserve chamber 38 through rebound passages 80 and past base rebound valve assembly 84. Rebound base valve assembly 84 operates as a check valve and does not significantly contribute to creating the damping characteristics for damper 20. Air adjustment valve 22 allows fluid flow from upper working chamber 32 to reserve chamber 38 during a rebound stroke to change the damping characteristics for damper 20 from firm to soft.

The pressure signal 18 is determined by the air pressure in air spring 12. This air pressure from air spring 12 is transported by hose 68 to upper membrane 62. As such, upper membrane 62 presses oil in chamber 58 through aperture 60 and into chamber 56 to press lower membrane 52 against the surface of nipple 50, thereby controlling flow from down tube 44 to reserve chamber 38. When the air pressure is relatively low (lightly loaded vehicle) the fluid flow through air adjustment valve 22 will increase providing a softer damping characteristic for damper 20. When the air pressure is relatively high (heavily loaded vehicle) the fluid flow through air adjustment valve will decrease providing a firmer damping characteristic for shock absorber 10. Thus, the damping characteristics for damper 20 during a rebound stroke are directly related to the air pressure within air spring 12.

As detailed above, the damping characteristics for shock absorber 10 in both compression and rebound are controlled by air adjustment valve 22 to provide a relatively soft ride for lightly loaded vehicles and a relatively firm ride for heavily loaded vehicles.

Figure 3:
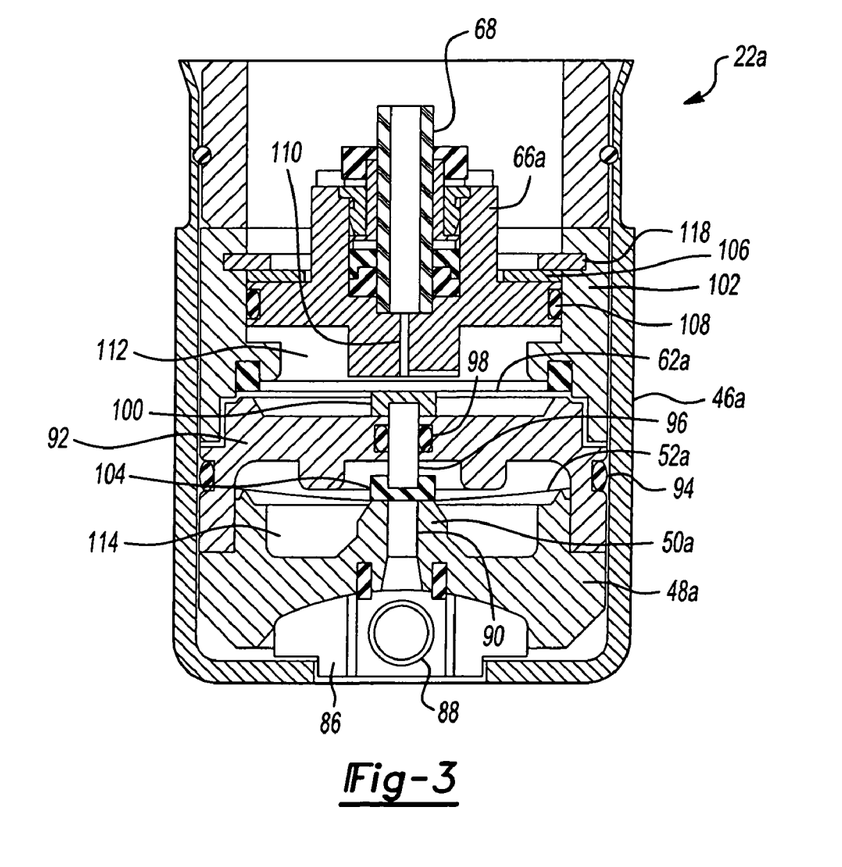
FIG. 3 is a cross sectional view of an air adjustment valve for an air pressure proportional damper according to the present invention.

Referring now to FIG. 3, a second embodiment of an air adjustment valve 22a is shown and described. Air adjustment valve 22a has a valve housing 46a that supports the elements of air adjustment valve 22a therein. Nipple support 48a includes nipple 50a. A bottom portion 86 has an aperture 88 that communicates upwards through a nipple hole 90. As in the first embodiment, nipple hole 90 communicates directly to a surface of a lower membrane 52a. Oppositely, aperture 88 communicates with down tube 44 to allow fluid from upper working chamber 32 to press against lower membrane 52a. Air adjustment valve 22a further includes a plunger housing 92 positioned within valve housing 46a and sealed by a seal 94. Plunger housing 92 supports a plunger 96 and a plunger seal 98. Plunger seal 98 and seal 94 serve to fluidly seal the area below plunger housing 92 from the area above plunger housing 92. Plunger 96 further includes a plunger head 100 that is connected to plunger 96 and contacts upper membrane 62a. Upper membrane 62a is further supported by a guiding ring 102. Plunger 96 is slidingly supported by plunger housing 92 and plunger seal 98 such that it can move up and down with respect to FIG. 3, thereby moving plunger head 100 and a plunger lower head 104 therewith.

Hose attachment housing 66a is slidingly positioned within guiding ring 102 and biased toward upper membrane 62a by a spring 106. A seal 108 is positioned within a groove of hose attachment housing 66a to seal an upper area of hose attachment housing 62a from a lower area of hose attachment housing 66a. Hose attachment housing 66a has a passage 110 that connects an air chamber 112 with an inside of hose 68 to communicate the pressure signal 18 to upper membrane 62a. Although not shown, a fluid chamber 114 communicates with an outlet 116 for the supply of fluid into reserve chamber 42 (see FIG. 2). Likewise, aperture 88 communicates fluid from down tube 44, through nipple hole 120 to contact lower membrane 52a.

In operation, during movement of piston 28, fluid from down tube 44 passes through nipple hole 90 to contact lower membrane 52a. If the pressure from nipple hole 90 is sufficient to overcome the load applied to plunger 96 by air pressure supplied from air spring 12, lower membrane 52a pushes plunger 96 upward to allow fluid to pass from nipple hole 90 and enter fluid chamber 114. As such, fluid from fluid chamber 114 passes to outlet 116 to enter reserve chamber 38.

The resistance on plunger 96 and thus lower membrane 52a is determined by the air pressure traveling from hose 68, through passage 110 and into air chamber 112. Air pressure in air chamber 112 moves hose attachment housing 66a and spring 106 against a spring retainer 118. This pressure in air chamber 112 also presses upper membrane 62a against plunger head 100, thereby urging plunger 96 downward against lower membrane 52a. This serves to restrict fluid flow from nipple hole 90 that enters fluid chamber 114. However, when the air pressure in hose 68 is reduced, the air pressure in air chamber 112 also reduces, thereby allowing spring 106 to overcome the force created by the air pressure and drop hose attachment housing 66a toward upper membrane 62a. This reduction in pressure also reduces the force on plunger 96 and thereby lower membrane 52a. When the air pressure in air chamber 112 is sufficiently low, hose attachment housing 66a drops onto upper membrane 62a. As a result, the force acting on upper membrane 62a is only from the spring force of spring 106. Therefore, in this position, spring 106 acts as a default or minimum resistance to be applied to lower membrane 52a. Thus, air adjustment valve 22a controls the damping characteristics for damper 20 in a manner similar to air adjustment valve 22.

Figure 4:
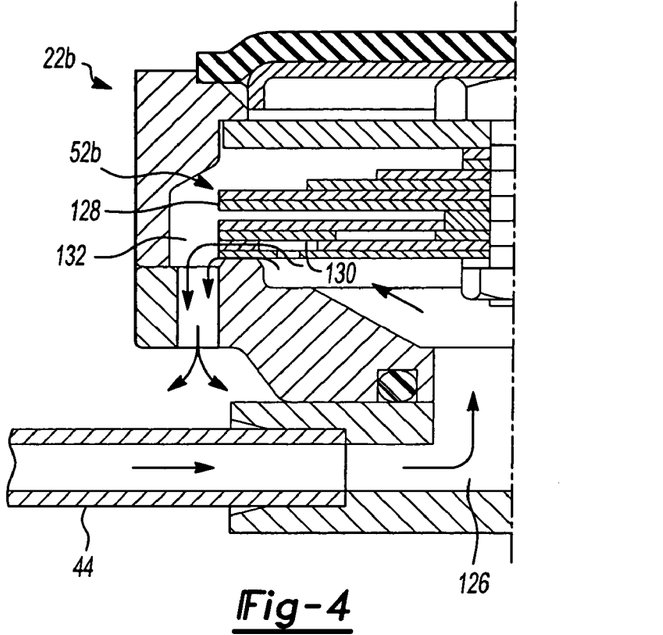
FIG. 4 is a cross sectional view of a portion of an air adjustment valve for an air pressure proportional damper according to the present invention.
Figure 5:
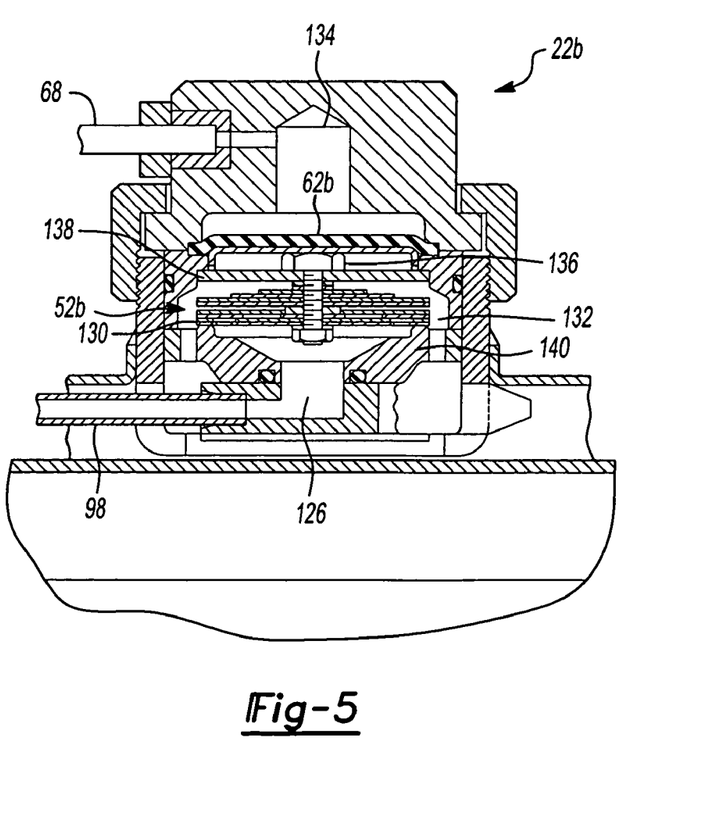
FIG. 5 is a cross sectional view of an air adjustment valve for an air proportional damper according to the present invention.

Referring now to FIGS. 4 and 5, a third embodiment of the present invention is shown and described. In FIG. 4, down tube 44 enters a bottom chamber 126 of an air adjustment valve 22b. A lower membrane 52b comprises a plurality of flexible plates 128. Within two of bottom plates 128 of lower membrane 52b is a first fluid passage 130. Passage 130 allows a small amount of fluid to pass from bottom chamber 126 into a chamber 132 to be communicated out to outlet 116. As a result, during small and low flow rates, passage 130 is sufficient to allow venting of fluid from bottom chamber 126 to chamber 132. However, as the fluid flow increases, passage 130 is insufficient to handle the volumetric flow rate of fluid, from bottom chamber 126 to outlet 116. Therefore, lower membrane 52b flexes to open a second fluid passage or flow path to allow sufficient fluid flow.

Referring now to FIG. 5, the entire air adjustment valve 22b is shown and described. Here, air from hose 68 is fed to a chamber 134 that is positioned above and in fluid communication with an upper membrane 62b. As a result, upper membrane 62b presses against a bolt 136 and a plate 138 to thereby press lower membrane 52b against a support 140. As a result, the resistance that lower membrane 52b provides against fluid flow from bottom chamber 126 is directly proportional to the air pressure supplied through hose 68. Thus, air adjustment valve 22b controls the damping characteristics for damper 20 in a manner similar to air adjustment valve 22.

Figure 6:
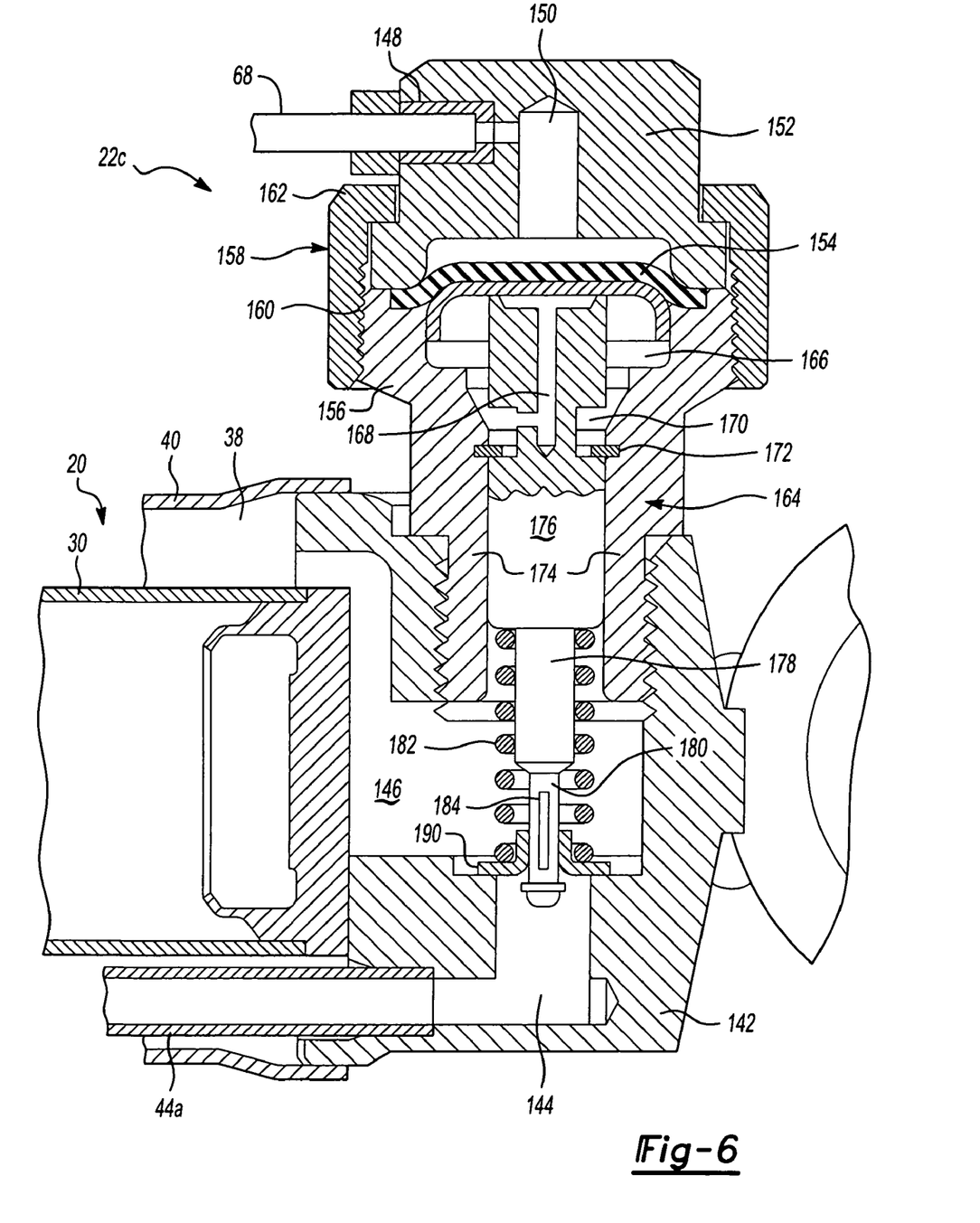
FIG. 6 is a cross sectional view of an air adjustment valve for an air pressure proportional damper according to the present invention.

Referring now to FIG. 6, another embodiment of the present invention is shown and described. In FIG. 6, a modified down tube 44a extends through the entire length of reserve chamber 38 and terminates at a bottom portion 142. Air adjustment valve 22c is positioned in bottom portion 142 to seal a passage 144 from a passage 146 that leads to reserve chamber 38.

Air adjustment valve 22c includes a hose attachment 148 that clamps an end of hose 68. A passage 150 is positioned in an air adjustment valve main body 152 for fluidly communicating hose 68 with an upper surface of a membrane 154. Air adjustment valve main body 152 is attached to an air adjustment valve lower main body 156 by a threaded clamp 158. Threaded clamp 158 has threads 160 that thread to air adjustment valve main body 152 at one end of threaded clamp 158 and has an L-shape portion 162 that clamps against a shoulder of air adjustment valve main body 152. Membrane 154 is locked between air adjustment valve main body 152 and air adjustment valve lower main body 156 by the clamping force applied from threaded clamp 158.

Air adjustment valve lower main body 156 supports a valve 164 in sliding engagement therein. A space 166 positioned between valve 164 and air adjustment valve lower main body 156 is filled with oil. A passage 168 allows oil from space 166 to communicate with a top portion of valve 164. A travel groove 170 is positioned in the outer periphery of valve 164. A travel stop 172 is attached to inner sidewalls of air adjustment valve lower main body 156 to limit travel of valve 164 by contacting lower and upper walls of travel groove 170 depending on the position of valve 164. Air adjustment valve lower main body 156 has a lower threaded area 174 that threadingly attaches to bottom portion 142 of damper 20.

Valve 164 has three stepped areas, first step area 176, second step area 178 and third step area 180. First step area 176 is slidingly engaged with air adjustment valve lower main body 156 to support guide valve 164. Second step area 178 has a reduced diameter to allow a spring 182 to be located against the flat surface where second step area 178 intersects with first step area 176. Third step area 180 has a groove 184 that allows a small amount of fluid to pass from passage 144 to passage 146. Positioned around third step area 180 is a valve seat 190. Spring 182 biases valve seat 190 against an inner surface of bottom portion 142 for sealing fluid in passage 144 from passing to passage 146.

In operation, pressure signal 18 passed by hose 68 to passage 150 urges membrane 154 against valve 164. This causes movement of valve 164 in a downward direction with respect to FIG. 6, thereby compressing spring 182 against valve seat 190. As a result, an increased force is required to move valve seat 190 against spring 182 from passage 144 to passage 146. However, groove 184 allows a minimal flow of fluid to pass from passage 144 to passage 146 without movement of valve seat 190. Accordingly, the amount of force required to move valve seat 190 is proportional to the air pressure supplied from hose 68. Therefore, an increase in a pressure supplied by air spring 12 causes an increased stiffness of the air pressure proportional damper 10. When the pressure from hose 68 is reduced, valve 164 is retracted upward with respect to FIG. 6 until travel stop 172 restricts any further movement. Therefore, this position acts as a default to ensure that a minimal amount of spring force by spring 182 retains valve seat 190 in a closed position. This acts to provide a minimum damping force supplied by damper 20. Thus, air adjustment valve 22c controls the damping characteristics for damper 20 in a manner similar to air adjustment valve 22.

Figure 7:
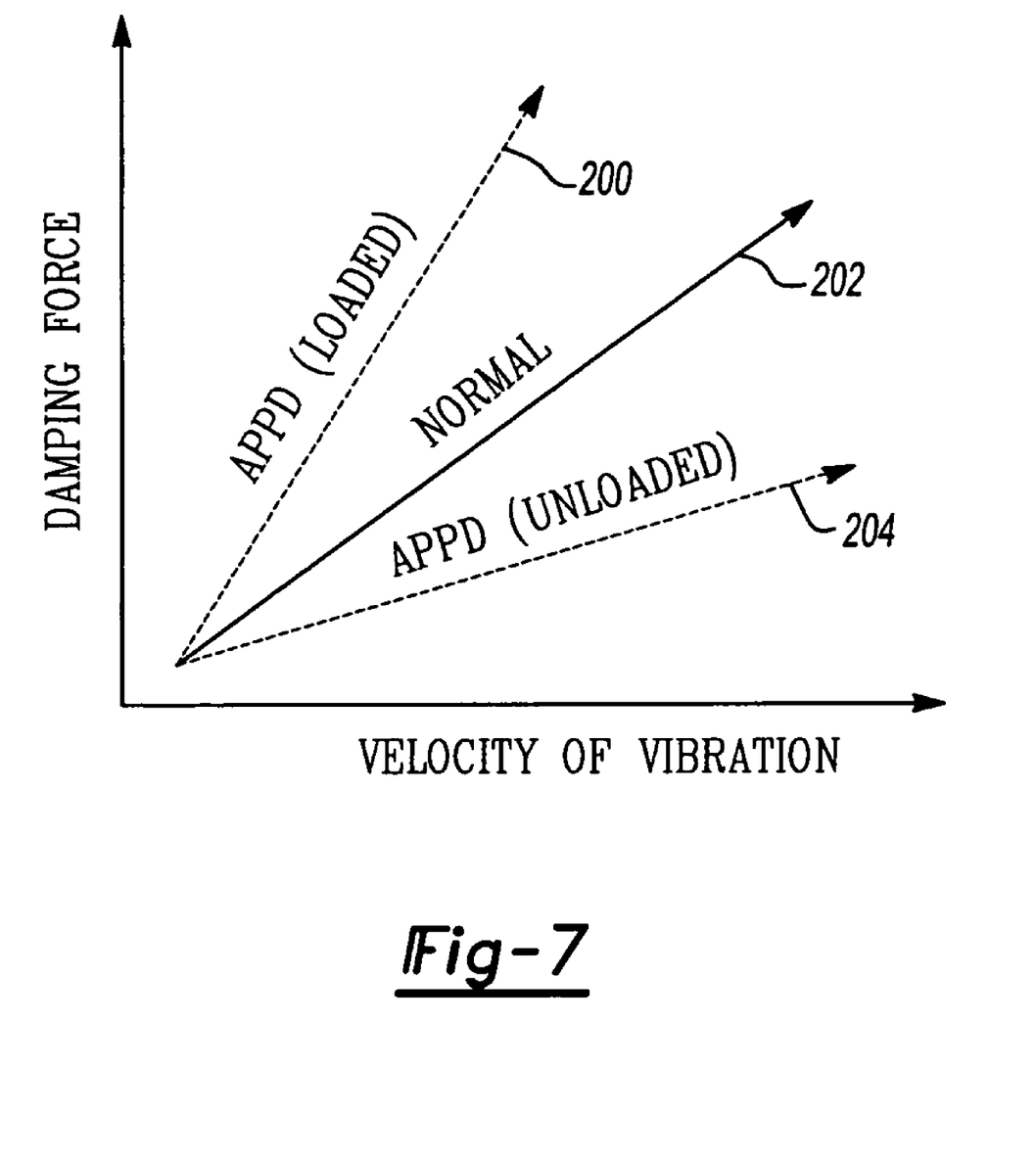
FIG. 7 is a graphical view describing a load and unloaded state for an air pressure proportional damper according to the present invention.

Referring now to FIG. 7, a graphical view of the damping force with respect to the velocity of vibration is shown. Here, 200 illustrates air pressure proportional damper 10 when vehicle body 16 is loaded, thereby having a high pressure in air spring 12 and a resultant high air pressure signal 18. As can be seen, in this situation the damping force greatly increases with respect to vibration velocity. Likewise, 202 illustrates a normal vehicle load and the resulting reduced damping force with respect to velocity. The reduced pressure in air spring 12 causes a reduced air pressure signal 18 and thereby a reduced damping force as described previously. Lastly, 204 illustrates a light load and a resulting low pressure in air spring 12. As a result, the air adjustment valves are all either at a low damping or default position as described previously, thereby resulting in a low damping force with respect to velocity.

It should be noted that pressure signal 18 can also be in the form of an electrical or optical signal representative of the air pressure within air spring 12. In this situation, the air adjustment valve would adjust resistance of air flow therethrough via a device such as a solenoid or other electrically actuated valve.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air pressure proportional damper comprising:
a container having a first chamber and a second chamber;
a piston rod slidingly disposed in the first chamber of the container;
a piston attached to the piston rod, the piston being in sliding engagement with walls of the first chamber;
a valve disposed between the first chamber and the second chamber, the valve regulating fluid flow between the first chamber and the second chamber through a first fluid passage and a second fluid passage separate from said first fluid passage;
a membrane movable between a first position where the second fluid passage is open and a second position where the second fluid passage is closed to prevent fluid flow through the second fluid passage, the membrane defining the first fluid passage as an aperture extending through the membrane to allow a specified amount of fluid flow between the first chamber and the second chamber through the first passage when the membrane is in the second position;
a pressure signal supplied from an air spring to the valve;
wherein the valve regulates fluid flow from the first chamber to the second chamber proportional to the pressure signal.

2. The air pressure proportional damper as claimed in claim 1, further comprising a down tube connecting the first chamber to the valve; and
an outlet connecting the second chamber to the valve, wherein fluid passing from the first chamber to the second chamber passes from the down tube to the outlet.

3. The air pressure proportional damper as claimed in claim 2, wherein the membrane is disposed over an end area of the down tube, and
the membrane applies a resistance force over the end area of the down tube proportional to the pressure signal.

4. The air pressure proportional damper as claimed in claim 3, wherein the membrane comprises a plurality of stacked plates.

5. The air pressure proportional damper as claimed in claim 1, wherein the first chamber includes an upper working chamber and a lower working chamber, and wherein the second chamber is a reserve chamber.

6. The air pressure proportional damper as claimed in claim 1, wherein the pressure signal is transmitted to the valve by a hose, the pressure signal being air pressure supplied by the air spring.

7. An air pressure proportional damper comprising:
a first chamber;
a second chamber;
an air adjustment valve, the first chamber fluidly communicating with the second chamber through the air adjustment valve, wherein the air adjustment valve comprises:
a nipple support supporting a nipple, the nipple having an aperture therethrough, communicating with the first chamber;
a lower membrane having a first side and a second side, the first side of the lower membrane contacting an upper side of the nipple and the aperture;
a plunger supported by a plunger support, a first end of the plunger contacting the second side of the lower membrane;
an upper membrane having a first side and a second side, the first side of the upper membrane contacting a second end of the plunger; and
a hose attachment housing supported by a guiding ring, a space defined by an area between the hose attachment housing, the guiding ring and the second surface of the upper membrane, a spring disposed in the guiding ring that biases the hose attachment housing toward the second side of the membrane;
wherein a second space is defined between the nipple support and the first side of the membrane, the second space communicating with the second chamber.

8. The air pressure proportional damper as claimed in claim 7, further comprising an air hose attached to the hose attachment housing that supplies air pressure from an air spring into the space.

9. The air pressure proportional damper as claimed in claim 8, wherein a surface of the hose attachment housing presses against the second side of the second membrane when air pressure supplied from the air spring is below a predetermined value.

10. The air pressure proportional damper as claimed in claim 8, wherein air pressure supplied from the air spring pressurizes the space to press the upper membrane into the plunge and the plunger against the lower membrane to apply a sealing force to the nipple for restricting fluid flow from the first chamber to the second chamber.

11. An air pressure proportional damper comprising:

a first cylindrical chamber;

a second cylindrical chamber disposed around the first cylindrical chamber;

a piston rod having a valve positioned at an end of the piston rod, the valve and the piston rod being in sliding engagement with walls of the first cylindrical chamber, an area in the first cylindrical chamber proximate the rod defining an upper working chamber, an area on a side of the valve in the cylindrical chamber distal from the rod defining a lower working chamber;

an air adjustment valve positioned at one end of the first cylindrical chamber and the second cylindrical chamber;

a down tube fluidly connecting the first cylindrical chamber to one side of the air adjustment valve, wherein the air adjustment valve regulates flow from the down tube to the second chamber;

wherein the air adjustment valve comprises:

an air adjustment valve main body;

an air adjustment valve lower main body attached to the air adjustment valve main body;

a membrane held in position between the air adjustment valve lower main body and the air adjustment valve main body;

a passage formed in the air adjustment valve main body to communicate air pressure to a top side of the membrane;

a sliding valve slidingly supported by the air adjustment valve lower main body, one end of the sliding valve positioned against a lower side of the membrane, an opposite side of the sliding valve having a valve seat that closes the down tube from passing fluid from the down tube to the second chamber;

a spring positioned between the valve seat and the sliding valve, the spring biasing the sliding valve against the membrane, the spring biasing the valve seat to a closed position.

12. The air pressure proportional damper as claimed in claim 11, further comprising a hose fluidly connecting an air spring to the upper surface of the membrane.

13. The air pressure proportional damper as claimed in claim 12, wherein air pressure from the air spring presses the membrane to move the sliding valve in a direction compressing the spring, the spring force pressing the valve seat to apply resistance to flow of fluid from the down tube to the second chamber.

14. The air pressure proportional damper as claimed in claim 11, further comprising a threaded clamp having an L-shaped portion at a first end and a threaded portion at a second end, the second end threaded to the air adjustment valve lower main body, the L-shaped first end engaging the air adjustment valve main body to clamp the air adjustment valve main body to the air adjustment valve lower main body.

15. The air pressure proportional damper as claimed in claim 14, wherein the membrane is clamped between the air adjustment valve main body and the air adjustment valve lower main body.

16. The air pressure proportional damper as claimed in claim 11, further comprising travel stops affixed to the air adjustment valve lower main body, the travel stops riding in a groove in the sliding valve, the groove being a longer length than the travel stops to set a fixed sliding distance of the sliding valve with respect to the air adjustment valve lower main body.

17. The air pressure proportional damper as claimed in claim 11, wherein an end of the sliding valve proximate the valve seat has a groove therein, the groove allowing a minimal flow of fluid from the down tube to the second chamber.

\* \* \* \* \*

UNITED STATES PATENT AND TRADEMARK OFFICE
CERTIFICATE OF CORRECTION

PATENT NO. : 7,562,750 B2
APPLICATION NO. : 10/775881
DATED : July 21, 2009
INVENTOR(S) : Luc Lemmens et al.

Page 1 of 1

It is certified that error appears in the above-identified patent and that said Letters Patent is hereby corrected as shown below:

Col. 9, line 4, claim 10, "plunge" should be --plunger--

Signed and Sealed this

Twenty-second Day of December, 2009

David J. Kappos
*Director of the United States Patent and Trademark Office*